United States Patent [19]
PeQueen

[11] 3,805,392
[45] Apr. 23, 1974

[54] TRY SQUARE

[76] Inventor: John D. PeQueen, 8415 Knapp Rd., West Falls, N.Y. 14170

[22] Filed: Aug. 21, 1972

[21] Appl. No.: 282,543

[52] U.S. Cl. .................................. 33/75 C, 33/112
[51] Int. Cl. .............................................. B43l 7/02
[58] Field of Search............ 33/75 C, 93, 112, 75 R

[56] References Cited
UNITED STATES PATENTS
2,745,183  5/1956  PeQueen............................ 33/75 C

*Primary Examiner*—Louis R. Prince
*Assistant Examiner*—Willis Little

[57] ABSTRACT

An improved try square in which a series of rigid lever arms housed in the square base multiply small movements of the square blade which is pivotally mounted on the base into large movements displayed and readable on a dial indicator carried by the base.

10 Claims, 7 Drawing Figures

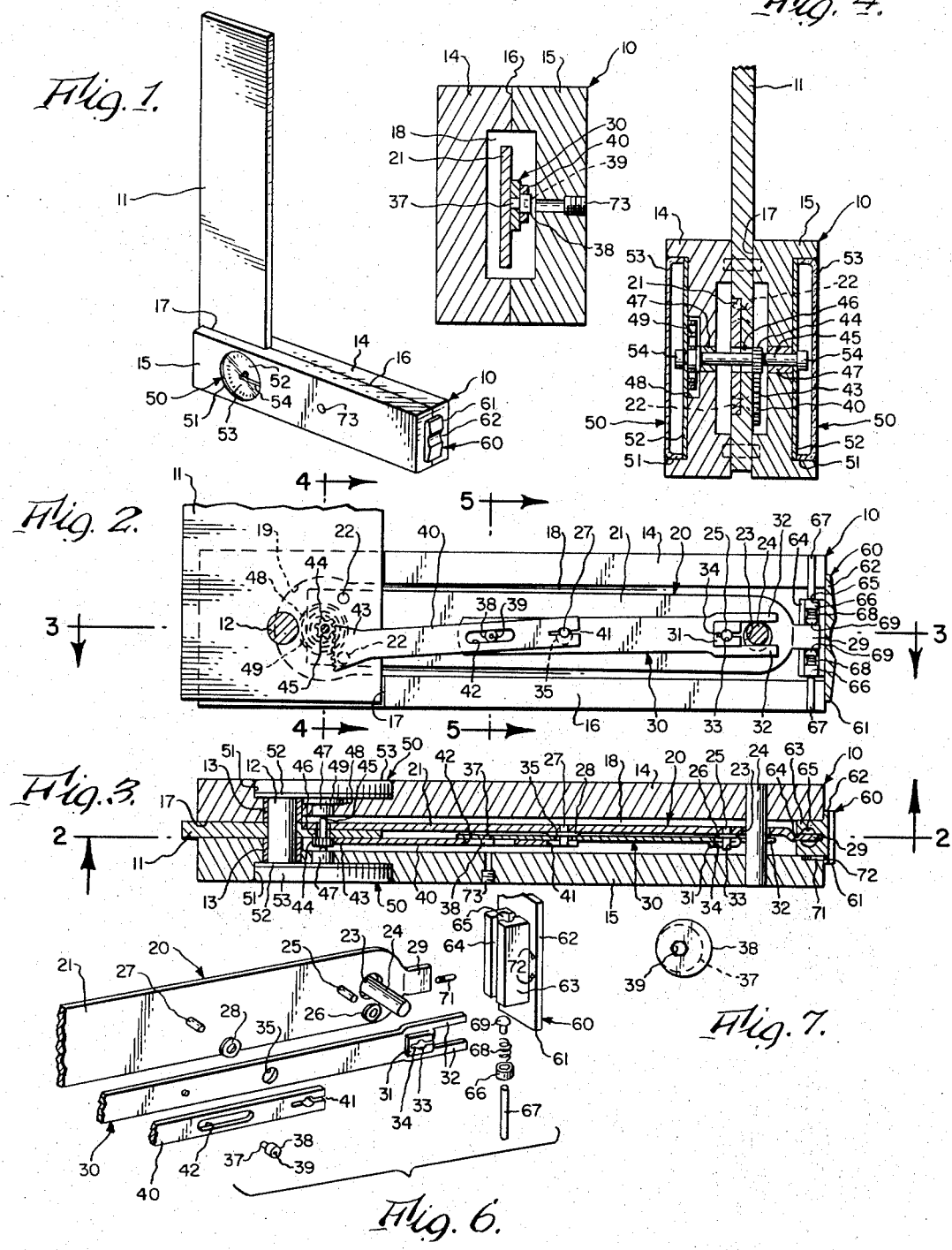

3,805,392

1

TRY SQUARE

This invention relates to a tool maker's square or other try square and more particularly to an improved form of the tool maker's square shown in my prior U.S. Pat. No. 2,745,183 wherein the blade of the square is pivotally connected to a base to have a small degree of angular movement relative thereto, means are provided for selectively biasing the blade element to either limit of its angular movement, and the base carries means for multiplying movement of the blade and a suitable dial indicator operably connected to the movement multiplying means whereby the square is useable to check and visuably indicate small deviations of angularly related elements from a desired angular relationship.

Manufacture and use of the square shown in the above noted patent, have indicated the need for an improved square construction which will be less expensive to manufacture and assemble, which will provide a simplified adjusting means, and which will have an improved means for greatly multiplying angular movement of the blade thereby allowing wider spaced markings on the dial indicator and a location of said indicator which will facilitate use of the square.

Accordingly the objects of this invention are to provide a tool maker's square or like tool which is less expensive to manufacture and assemble and which is easier to adjust, read and use.

Another object is to provide such a square with an improved compound motion multiplying means, which may be formed and arranged within the base of the square and operably connected to its blade and to a suitably marked dial indicator in the head, to greatly multiply small angular movements of the blade and cause large angular movements of the hand or finger of the indicator, whereby the graduations or markings of the dial indicator may be more widely spaced and more easily read.

Another object is to provide an improved means for selectively biasing and resiliently securing the blade at either limit of its angular movement.

Another object is to provide an improved compound motion multiplying means which will allow locating the dial indicator on the square base in a position where it does not interfere with normal use of the square.

Another object is to provide the compound motion multiplying means with a simple and effective adjusting means operable to move it independently of movement of the blade for causing it to move and accurately register the hand of the dial with a selected marking thereof.

These and other objects of the present invention will appear from a perusal of the following detailed description of a presently preferred form of try square and the drawings wherein:

FIG. 1 is a perspective view of a tool maker's square constructed in accordance with the principles of the present invention;

FIG. 2 is a vertical sectional view of the base of the square taken about on line 2—2 of FIG. 3 and showing the blade and the compound movement multiplying mechanism in elevation;

FIG. 3 is a horizontal sectional view taken about on the line 3—3 of FIG. 2;

FIG. 4 is a vertical sectional view taken about on line 4—4 of FIG. 2;

2

FIG. 5 is a vertical sectional view taken about on the line 5—5 of FIG. 2;

FIG. 6 is a group perspective view showing portions of the elements of the movement multiplying mechanism and;

FIG. 7 is an enlarged elevational view of an eccentrically mounted cam for adjusting the movement of the multiplying mechanism to register the hand of the dial indicator with selected markings thereof.

Referring now to the drawings, wherein like characters of reference denote like parts, the numeral 10 generally designates the base or head of the square to one end of which the upright blade 11 is pivotally connected by a pivot pin 12 which, intermediate its ends, is press fitted in the blade, and which has its opposite end portions journaled in bearings 13 carried by the base 10.

In order to avoid the expense of the prior practice of forming the base of the square of several plate parts which were assembled by a time consuming operation, the improved base 10 is made up of a pair of complementary plates 14 and 15 which are formed in a manner to be described and which, being accurately alined, are securely fused or welded together as at 16.

Each of the plates 14 and 15 has one of its end portions transversely reduced to provide the base 10 with a slot 17 to snugly receive the blade 11, and each of the plates 14 and 15 is longitudinally slotted from the opposite end inward to provide the base 10 with a chamber 18 terminating in an inner enlargement 19 in which the compound motion multiplying mechanism, generally indicated by the numeral 20, is mounted.

The mechanism 20 includes a rigid primary lever arm 21 which, being connected to the blade 11 by the rivets 22, extends normal to the blade and toward the open end of the chamber 18. The distal end of the arm 21 is provided with a centrally located hole 23 through which a pin 24, carried by the distal ends of the base 10, transversely extends. The relative diameters of the hole 23 and the pin 24 are such that the conjoint pivotal movements of the arm 21 and the blade 11 about the pivot pin 12 are limited and the swinging movement of the outer end of the blade 11 from either side of a plane normal to the head 10 is thereby limited to a movement in the order of five one-thousandth of an inch (0.005 inch).

The primary arm 21 inwardly of the hole 23 as shown in FIGS. 2 and 6, is provided with a spaced pair of centrally located pins 25 and 27, upon the former of which a rigid secondary lever arm, generally indicated by numeral 30, is carried. The outer end portion of the secondary arm 30 is longitudinally slit to provide a central tab 31 which, upon being folded flat thereupon, provides said end of the arm with a bifurcation, the arms 32 of which are spaced to snugly engage the pin 24. The tab 31 and the underlying portion of the secondary arm 30 are provided with a transversely central hole 33 to snugly receive the pin 25 and with a slot 34 formed and arranged therein to allow forcing of the arms 32 and the sides of the hole 33 into a proper snug engagement with the pins 25 and 24, respectively.

The secondary arm 30, being slightly spaced from the primary arm 21 by a washer 26 carried by the pin 25 and by a similar washer 28 carried by the pin 27, has its medial portion formed with a centrally located hole 35 of a diameter to loosely embrace the pin 27 and thereby limit swinging movement of the arm 30 about the pin 25 to a distance equal to the difference between the diameter of the pin 27 and the hole 35. The other end portion of the arm 30 rotatably carries a stud 37 formed with an eccentric head 38 and a socket 39 formed to receive a tool, such as an Allen wrench, by means of which the stud may be rotated for the purpose of adjusting the mechanism in a manner to be described.

A rigid third or tertiary lever arm 40 has its outer end formed with a central hole and slot formation, indicated by the numeral 41, for adjustably journaling it upon the pin 27, as its intermediate portion formed with a central slot 42 to snugly receive the eccentric head 38 of the stud 37, and has its inner end formed with a gear sector 43.

As best seen in FIG. 2, the gear sector 43 extends alongside the blade 11 and meshes with a small pinion gear 44 rigidly secured upon the medial portions of a small shaft 45, as best seen in FIGS. 3 and 4, being extended axially through the alined clearance holes 46 formed in the blade 11 and the arm 21 to allow their conjoint swinging movement about the pivot pin 12 without touching the gear or the shaft. This shaft 45 is journaled in suitable alined bearings 47, each carried by one of the plates 14 and 15. The plate 14 concentric with the axis of the shaft 45 is provided with a counterbore 48, to receive a coiled hair spring 49 which has one of its ends anchored in said counter-bore and its other end secured to the shaft 45, thereby to resiliently bias or urge the shaft to rotate in a predetermined direction (clockwise or counter-clockwise) and the side of each of the plates 14 and 15 is shown counterbored at 51 to receive the elements of a dial indicator, generally indicated by the numeral 50.

The dial indicators 50 each include a suitably marked or graduated disc 52 secured upon the back wall of the counterbore 51, a cup shaped transparent cover member 53 frictionally held in the counterbore 51 to encase the disc, and an indicator finger 54 rigidly carried by an associated end of the shaft 45.

In order to facilitate use of the square an improved means, generally designated 60, for resiliently biasing and holding the arm 21 and the blade 11 in either of their limit positions is located at the open end of the base 10. The means 60 includes a member 61 formed with a plate portion 62, which is slidably mounted upon the distal end of the head 10 to cover the open end of the chamber 18, and with an integral block portion 63 which, being longitudinally slotted as at 64 midway between its sides to slidably receive a tongue 29 formed on the outer end of the primary arm 21, is also formed with a longitudinal central bore 65. A bushing 66 is press fitted in each end of the bore 65 to slidably receive the inner end of one of a pair of pins 67 which, being carried by the base 10, serve to slidably retain the member 61 therein. A pair of light helical coil springs 68, each having one of its ends seated in a counterbore in the inner end of one of the bushings 66 and having its opposite end engaged about a stem portion of a button 69, resiliently bias or urge said buttons to contact their respective adjacent surfaces of tongue 29. During sliding movement of the member 61 in a downward direction, as viewed in FIG. 2, the upper spring 68 will be compressed to exert a downward force on the upper surface of the tongue via intermediate upper button 69 to rotate arm 21 clockwise about the pivot pin 12 such that the blade is slightly inclined toward the head. It will be understood that during opposite or upward movement of the member 61, the lower spring 68 will be compressed to exert an upward force on the lower surface of the tongue via intermediate lower button 69 to rotate arm 21 in a counter-clockwise direction about the pivot pin 12 such that the blade is slightly inclined away from the head. As shown in FIGS. 3 and 6, a spring actuated detent 71 is carried by the base and is engageable with either of a pair of depressions 72 formed in the plate 62 for resiliently and releasably holding it in either selected limit position. When the slide has been moved to and is held at one of the upper or lower limit positions by the detent 71 being snapped into one of depressions 72, the opposing upper and lower springs 68, acting on their respective upper and lower surfaces of the tongue, will seek to achieve a force balance, thereby centering the tongue with respect to the slide. However, since the slide is held in one of its limit positions, this centered position of the tongue with respect to the slide will cause the blade to be inclined with respect to the base.

The blade 11, being thus resiliently held in a selected limit position, is moved against a surface to accurately determine its squareness with another surface, and, by reason of the improved compound movement multiplying mechanism, any small movement of the blade causes a greatly increased movement of the finger of the dial indicator which, being calibrated to show the squareness or the lack of squareness of the surface on a greatly increased scale, is readily read.

A small hole formed in the plate 15 in axial alinement with the stud 37 is normally closed by a threaded plug or closure 73 which, when removed, allows the end of a tool to be engaged in the socket 39 to slightly rotate the eccentric head 38 and thereby swing the third arm 40 about the pin 27 until the indicator finger 54 registers with a selected calibration on the disc 52.

It should be understood that the herein shown and described form of improved tool makers square is intended to exemplify the principles of the present invention and that various modifications and rearrangements of its component parts may be made within the scope of the appended claims wherein:

What is claimed is:

1. In a try square including a base, a blade pivotally connected to said base, and a dial indicator carried by said base, the improvement of motion multiplying means operatively interposed between said blade and dial indicator whereby small movements of said blade are multiplied and shown as large movements on said dial indicator, which comprises a rigid primary lever arm fixed to said blade, means limiting pivotal movement of said primary arm relative to said base, a rigid secondary lever arm alongside said primary arm, means fulcruming one end of said secondary arm on said base, means pivotally mounting said secondary arm adjacent said one end thereof on said primary arm, a tertiary lever arm alongside said secondary arm, means pivotally connecting one end of said tertiary arm on said primary arm, means fulcruming said tertiary arm adjacent its said one end on the other end of said secondary arm, a gear sector on the other end of said tertiary arm, a pinion gear meshing with said gear sector, and an indicating finger movable with said pinion gear.

2. A try square according to claim 1 wherein said means limiting pivotal movement of said primary arm provides two limit positions for said primary arm, and means for resiliently biasing and holding said primary arm in either of its said limit positions.

3. A try square according to claim 2 wherein said means for resiliently biasing and holding includes a selectively positionable slide member and detent means therefor.

4. A try square according to claim 1 wherein said fulcruming means for said tertiary arm includes a stud rotatably adjustably carried by said secondary arm and having an eccentric head portion engaged by said tertiary arm, whereby rotational adjustment of said stud causes its said head portion to pivot said tertiary arm about its pivotal mounting on said primary arm and thereby move and register said indicating finger with a selected one of the calibrations of said dial indicator.

5. A try square according to claim 4 wherein said motion multiplying means are encased in said base which is provided with an access hold for said stud, and a removable closure for said hole.

6. A try square according to claim 1 wherein means limit pivotal movement of said secondary arm relative to said primary arm.

7. A try square according to claim 1 wherein said means limiting pivotal movement of said primary arm comprises a pin carried by said base and extending through an enlarged hole provided in said primary arm, the axis of said pin being substantially parallel to that for the pivotal mounting of said blade on said base.

8. A try square according to claim 7 wherein the axis of the pivotal mountings of said secondary and tertiary arms are substantially parallel to each other and to said axis of said pin.

9. A try square according to claim 8 wherein said fulcruming means for said secondary arm comprises a bifurcated end on said secondary arm embracing said pin.

10. A try square according to claim 8 wherein said fulcruming means for said tertiary arm comprises a stud carried by said secondary arm and received in a slot provided in said tertiary arm.

* * * * *

PO-1050
(5/69)

UNITED STATES PATENT OFFICE
CERTIFICATE OF CORRECTION

Patent No. 3,805,392          Dated April 23, 1974

Inventor(s)    JOHN D. PeQUEEN

It is certified that error appears in the above-identified patent and that said Letters Patent are hereby corrected as shown below:

```
Col. 2, line 38:   "ends" should be --end--;
Col. 2, line 45:   "one-thousandth" should be --one-thousandths--;
Claim.5, line 3:   "access hold"  should be --access hole--.
```

Signed and sealed this 10th day of September 1974.

(SEAL)
Attest:

McCOY M. GIBSON, JR.          C. MARSHALL DANN
Attesting Officer             Commissioner of Patents